United States Patent

[11] 3,569,791

[72] Inventor Uriel Vogel
 Patchogue, N.Y.
[21] Appl. No. 868,441
[22] Filed Oct. 22, 1969
[45] Patented Mar. 9, 1971
[73] Assignee The United States of America as represented by the United States Atomic Energy Commission

[54] REMANENT-FREE PULSING MAGNETS
 8 Claims, 4 Drawing Figs.
[52] U.S. Cl.................................................... 317/123,
 322/8, 322/100, 317/148.5
[51] Int. Cl...................................................... H01f 7/18
[50] Field of Search........................................... 317/123,
 123 (CD); 322/7, 8, 100

[56] References Cited
UNITED STATES PATENTS
2,301,424 11/1942 List et al....................... 322/8

Primary Examiner—Lee T. Hix
Attorney—Roland A. Anderson

ABSTRACT: Alternating current generator system for pulsing and demagnetizing a multipole magnet for focusing charged particles in a high energy accelerator beam by switching off the field coil of an AC generator and switching the generator output into the magnet whereby the inertia of rotation of the generator supplies energy to the magnet with low leakage inductance in the generator.

INVENTOR.
URIEL VOGEL

INVENTOR.
URIEL VOGEL

REMANENT-FREE PULSING MAGNETS

BACKGROUND OF THE INVENTION

The operation of high energy particle accelerators, such as the Brookhaven Alternating Gradient Synchrotron described in Cyclic Particle Accelerators, by John J. Livingood, Van Nostrand, 1961, requires pulsing multipole magnets up to magnetic energies of several kilojoules or more. Due to remanent field problems in the main accelerator magnets, these magnets often produce a low field strength, e.g. 120 gauss, for receiving low energy particles at injection. Thereafter, the field strength increases up to a high value, e.g. 13,000 gauss, during each acceleration cycle to achieve particle accelerations of from 50 MeV to over 30 beV. To this end, the field must correctly and accurately correspond to the increasing particle velocities and the magnets must rapidly pulse and demagnetize for efficiency and high duty cycles. Also, auxiliary multipole magnets for the accelerator beam, comprising magnets for focusing and bending the charged particles along the circular equilibrium orbit in the accelerator, such as quadrupole and setupole correcting magnets, and like beam handling and charged particle transporting magnets for extracted beams, must contain repetitive pulses corresponding to the main magnet pulses e.g. for achieving a pulsed magnetic field about every 4 seconds.

In connection with the mentioned accelerator magnets, capacitor pulsing has been complicted, expensive, and bulky. Moreoever, the problem of isolating the load intermittently from the power line has been troublesome or rxpensive and complicated. For example, in the case of the main magnets, a large rotating flywheel has mechanically stored the excess energy between pulses. To this end, the magnet power supply for the main magnets has comprised a motor generator set having an alternator carrying the flywheel on its shaft, and the generator has required a bank of ignitrons that has rectified the alternator output to yield high voltage power for the magnets. At the peak field, the striking plate of the ignitrons has shifted to the reverse field range whereby the ignitrons have served as invertors for returning the magnetic energy to the flywheel through the alternator, which thereupon has acted as a motor.

SUMMARY OF THE INVENTION

This invention made in the course of, or under a contract with the United States Atomic Energy Commission, contemplates an unloaded AC generator triggered to pulse the inductive magnet load in a decaying train of oscillations for magnetic energies up to a few kilojoules. Thus, the decaying oscillation serves to demagnetize the load. Moreover, since the generator has a low output impedance and the coupling coefficient between the stator coil and rotor or field coil comes close to unity, the system of this invention provides high short circuit currents and a significant amount of available reactive energy for the load magnet. With the proper selection of components and operation, as described in more detail hereinafter, this invention provides the desired accurate repetitive and efficient magnet pulsing.

The above and further novel features and objects of this invention will appear more fully from the following detailed description when reading the same in connection with the accompanying drawings, which illustrate one embodiment of this invention, and the appended claims will point out the novel features thereof.

BRIEF DESCRIPTION OF THE DRAWINGS

In the drawings, where like elements have like references.

DESCRIPTION OF THE PREFERRED EMBODIMENT

Figure 1:
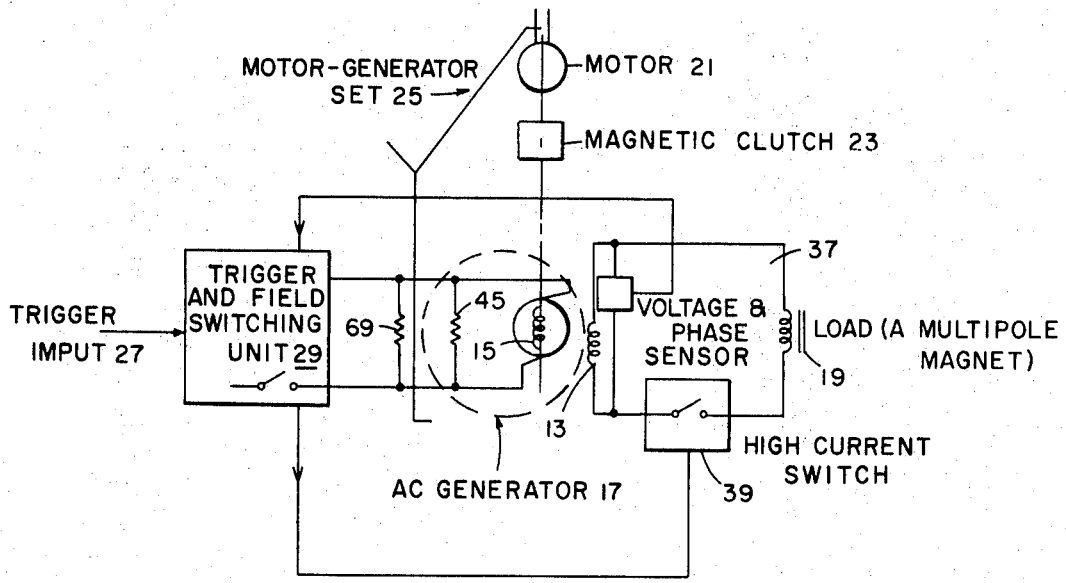
FIG. 1 illustrates a partial schematic drawing of the principles of the apparatus of the pulsing system of this invention.

This invention contemplates a pulsing system for conventional multipole magnets for transporting and/or focusing high energy charged particles. As such, this invention finds particular utility in connection with the charged particle accelerator known as the Brookhaven National Laboratory Alternating Gradient Synchrotron, hereinafter referred to as the BNL AGS. As understood from the following however, this invention also finds utility in connection with a wide variety of other accelerator applications requiring the efficient pulsing of the multipole electromagnets therefor. In understanding and applying this invention to the pulsing of these conventional, multipole, electromagnets hereinafter simply referred to as load magnets, the following discussion illustrates the determination of the relevant parameters, comprising short circuits and considers flux linkage and load matching with reference to the apparatus of this invention shown in FIG. 1, as will be understood in more detail from the following.

To express the magnetic flux in stator coil 13 and in the rotor or field coil 15 of AC generator 17, $$\Phi_s = L_s I_s + M \cos \Phi\, I_f \qquad (1)$$
$$\Phi_f = M \cos \Phi\, I_s + L_f I_f, \qquad (2)$$

where $\Phi_s$ and $\Phi_f$ represent the fluxes in the coil 13 and in the rotor or field coil 15 respectively, $L_s$ and $L_f$ represent the respective self-inductances, $M$ represents the maximum mutual inductance, and $\Phi$ represents the electrical phase angle between the rotor or field coil 15 and the stator coil 13. The angle $\Phi = \omega t$, where $\omega$ represents the electrical angular frequency of the geneotator 17 and $t$ equals time. Also, $M \cos \Phi$ in Eqs. (1) and (2) corresponds to a voltage generation term for the generator 17. Assuming a negligible impedance of the field source of current, several short circuit relations come from Eqs. (1) and (2) as follows:

$$\Phi_s = L_s I_s + M \cos \Phi\, I_f - \Phi M \sin \Phi\, I_f = 0 \qquad (3)$$
$$\Phi_f = M \cos \Phi\, I_s - \Phi M \sin \Phi\, I_s + L_f I_f = 0. \qquad (4)$$

The solution of these equations corresponds to:

$$I_s = \frac{I_{fo}}{2}\sqrt{\frac{L_f}{L_s}}\left(\frac{1+k\cos\phi}{1+k\cos\phi_o} - \frac{1-k\cos\phi}{1-k\cos\phi_o}\right) \qquad (5)$$

$$I_f = \frac{I_{fo}}{2}\left(\frac{1+k\cos\phi}{1+k\cos\phi_o} + \frac{1-k\cos\phi}{1-k\cos\phi_o}\right), \qquad (6)$$

where $I_{fo}$ equals the initial field current, $k = M\sqrt{L_s L_f}$ equals the magnetic coupling and $\Phi_o$ equals the initial phase angle. Since the value of $k$ approches but does not exceed unity, the peak currents exceed by several times $(I_{fo}/2)\, L_f/L = E/2\omega L_s$, where $E = \omega M I_{fo}$ equals the open circuit peak age of the stator coil 13. Triggering at $\Phi_o = 0$ gives a peak at $\Phi = \pi$ of $$I_{s\,max} \cong \frac{I_{fo}}{2}\sqrt{\frac{L_f}{L_s}}\frac{(1+k)}{(1-k)} \cong E/\omega L_s(1-k), \qquad (7)$$

where $I_s$ max equals the piak short circuit current. It follws, therefore, that a tighter magnetic coupling provides a higher $I_s$ max. Since in practice, as mentioned above, $k$ differs from unity by only a small percentage thereof, the short circuit currents normally exceed the nominal currents by an order of magntidue. Accordingly, a conventional generator 17 contains running rotor inertias having several times more energy than that required to pulse the load represented by a conventional quadrupole load magnet 19 for focusing charged particles in a high energy accelerator beam provided by the BNL AGS. For example, one conventional generator 17 tested had nominal ratings of: 125 kVA, 440/17V AC, 1150/200 r.p.m. 164 A, 3 pH, wherein the generator 17 had a motor 21 and magnetic clutch 23 in an MG set 25, and in which the clutch isolated the generator from the power lines for motor 21, and protected the components of the described MG set 25 from overloads and the like.

Figure 2:
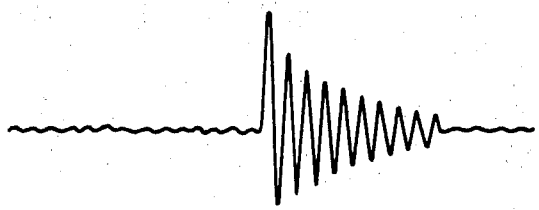
FIG. 2 represents an oscilloscope trace of the short circuit current of the apparatus of FIG. 1, wherein the ordinate corresponds to a trace at 200 A/division and the abscissa corresponds to a trace at a time of 50 ms/division.
Figure 3:
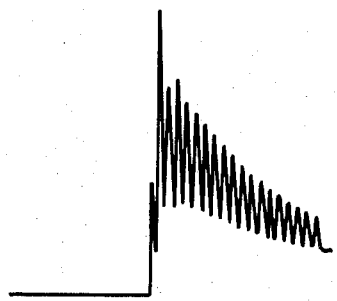
FIG. 3 represents an oscilloscope trace of the short circuit field coil voltage of the apparatus of FIG. 1, wherein the ordinate corresponds to voltage and the abscissa corresponds to a trace of 50 ms/division.

In the operations of the generator 17, the pulsing steps, in accordance with this invention comprise supplying the current for field coil 15 from a trigger input 27 and using a field-swtiching unit 29 therewith for cutting off this current through field coil 15. When thus switched off, a positive voltage swing of the decaying field energy triggers a voltage and phase sensor 37, which actuates a high current switch 39 that shorts one phase of the output of generator 17. FIGS. 2 and 3 illustrate respectively the short circuit output current of generator 17 and the voltage of field coil 15 wherein the testing of generator 17 followed the above-mentioned steps, and wherein the FIGS. correspond to abscissa time scales of 50 ms/division and in FIG. 2 the current or ordinate scale corresponds to 200 A/division. Also, the generator 17 ran close to synchronous speed wherein an open circuit measurement gave 46 V r.m.s. In estimating the reactive short circuit impedance $Z = \omega L_s (1 - k) = 46 \times \sqrt{2}/430 = 0.15\Omega$, available reactive energy gave a result of the order of $W = E^2_n/s\omega Z = 440^2/4 \times 120\pi \times 0.15 = 860$ J, where $W$ corresponds to the available energy, and $E_n$ corresponded to the nominal AC voltage.

Figure 4:
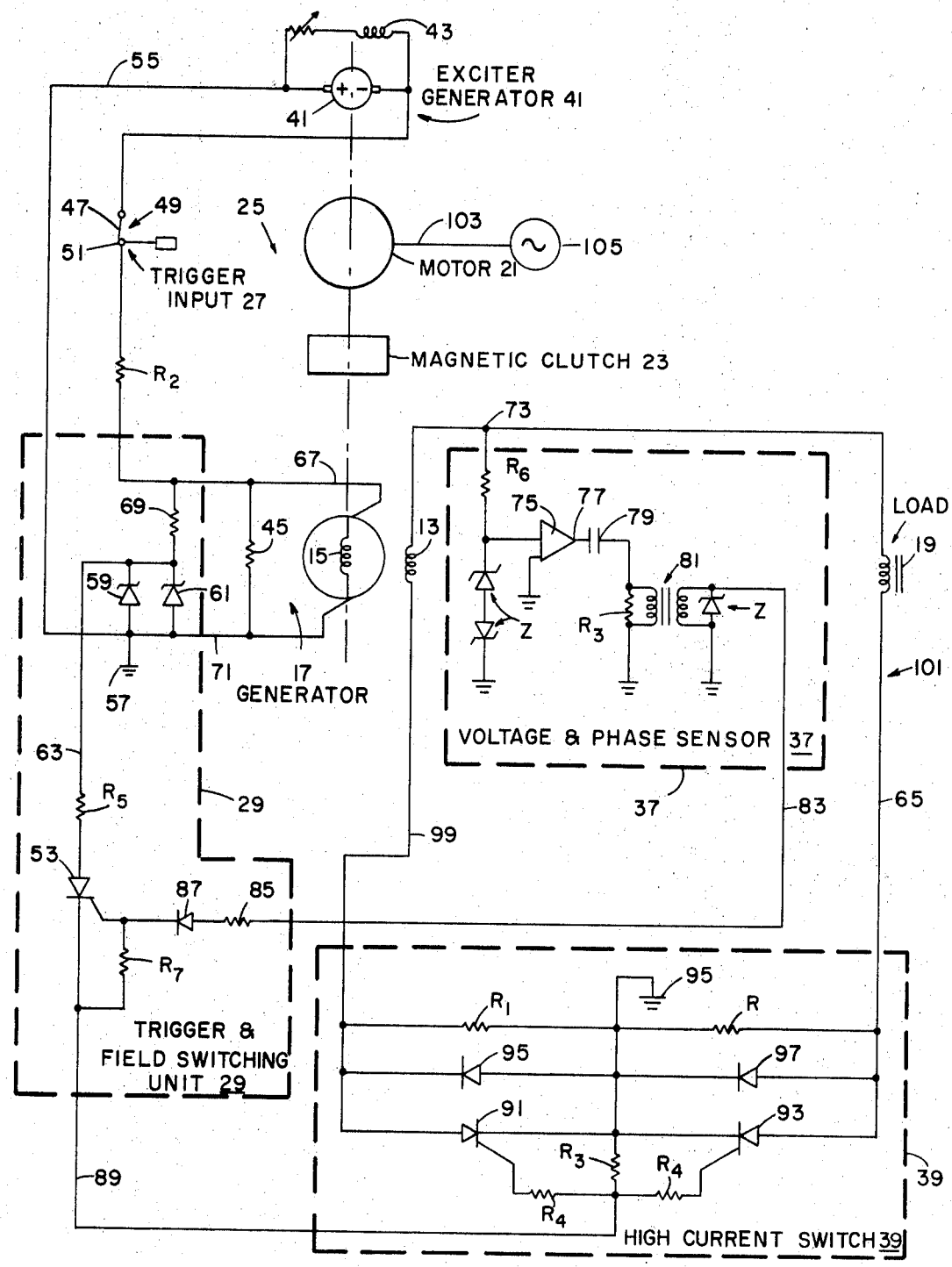
FIG. 4 represents a practical embodiment of the apparatus of this invention, illustrated schematically in FIG. 1.

Referring now to FIG. 4, in one cycle of a practical embodiment of this invention, motor 21 rotates exciter generator 41 having a shunt exciter field coil 43, thereby energizing the field coil 15 of three phase, AC generator 17, which field coil 15, motor 21 also rotates. Resistor 45 merely limits the current in field coil 15 when armature 47 of switch 49 engages contact 51.

At this point in the cycle, the stator coil 13 of generator 17 has therein a noload AC voltage, characteristic of generator 17 since high current switch 39 is substantially open due to a slightly negative voltage supplied to SCR 53 in trigger and field switching unit 29 by exciter generator 41. In this regard, "positive" DC lead 55 of a conventional DC exciter generator 41 connects to ground 57 and zener diodes 59 and 61, which assure sufficient current to ground 57 to maintain a small negative voltage on lead 63, thus to meaintain a negative voltage on the anode of SCR 53 to keep it open. The latter condition maintains high current switch 39 in a substantially open condition so that no substantial current flows through lead 65, load magnet 19, or stator coil 13 of generator 17.

When one desires a pulse in load magnet 19, armature 47 disengages from contact 51 to open switch 49, whereby the field current of field coil 15 flows through lead 67, resistor 69, zener diodes 59 and 61, and lead 71 back to field coil 15 in a circuit, thus to apply a positive voltage, limited by the zener diodes 59 and 61, to the anode of SCR 53. This readies the SCR 53 for triggering by a pulse from voltage and phase sensor 37.

The required pulse from voltage and phase sensor 37, occurs whenever the generator voltage at junction 73 crosses zero. To this end, differential voltage comparator 75, comprising a conventional commerically available integrated circuit, limits the applied output voltage thereof and converts the sinusoidal input at junction 73 to a stepped output voltage at the output terminal 77. Also, capacitor 79 and transformer circuit 81 differentiate the stepped voltage output to a narrow spike-shaped pulse, which flows in lead 83, resistor 85 and diode 87 to the gate of SCR 53 to trigger the SCR 53.

At this point in the cycle, current flows through lead 89 and the gates of SCR 91 and 93 to ground 95 due to the positive voltage on lead 63. Meanwhile, although the above-described spike-shaped pulse from voltage and phase sensor 37 has decayed, SCR 53 continues to conduct as long as the positive voltage remains on lead 63. Also, the SCR's 91 and 93 conduct alternately through diodes 95 and 97, depending on the phase of the voltage on leads 65 and 99, which connect with opposite ends of stator coil 13 in generator 17, thus closing the load circuit 101, to pulse load magnet 19 with the desired current pulse, such as is shown in FIG. 2, this pulse corresponding to the instantaneous field current in field coil 15. To this end, the field current in field coil 15 decays through resistors 45 and 69 in several AC cycles to a point where the positive voltage on lead 63 becomes insufficient to maintain gating currents for SCR 91 and 93. Thus, high current switch 39 opens to end one pulsing cycle, and armature 47 engages contact 51 again to prepare the described circuit 101 of the embodiment of this invention shown in FIG. 4 for the beginning of the next load magnet-pulsing cycle, at which point the exciter generator 41 supplies current to the field coil 15, as described above.

Thus, circuit 101 repeatedly pulses load magnet 19 during each pulsing cycle with a decaying chain of oscillations, the frequency of which can be controlled by changing the speed of rotation of the generator 17 in MG set 25, whereby the described system has great flexibility in controlling and changing the pulse width of the pulsing of load magnet 19. To this end, the speed of the motor 21 in the MG set 25 can be changed, by the use of a variable speed motor 21, by slipping clutch 23, or by the use of an otherwise variable speed drive for generator 17. Thus, the system of this invention utilizes standard MG sets, as available, or as modified by one skilled in the art in accordance with the teaching of this invention as described in more detail hereinafter, to optimize their capacity, to dump high peak currents into given load magnets, which in accelerators have fixed airgaps. Also, the described system uses low voltage power supplies, in contrast to conventional cpacitor discharge systems, which are expensive, bulky, and require stringent safety precautions due to their high voltages.

Additionally, the described system of this invention, isolates the pulsing circuit 101 for load magnet 19 from the power supply line 103 for motor 21, and thus avoids unacceptable surges and/or transients, which are objectionable in connection with conventional power sources 105. To this end, the inertia of the rotation of the motor 21 and generator 17 in MG set 25, minimizes the interaction of the line and load currents, as will be understood from the above. Moreover, the small but acceptable interaction can be completely eliminated by disengaging the motor and generator in MG set 25, by means of magnetic clutch 23, just prior to the described pulsing sequence of this invention.

Since the above considers only one phase, this leaves a significant volume of the generator 17 still remaining unused for the purpose of this invention. Accordingly, by rewinding the generator 17 and rearranging the connections of the field coil 15, in accordance with the teaching of this invention, the available energy increases to at least 2.5 kJ, as understood by those skilled in the art from a reading of the above. The following thus examines the load matching so that when connecting the inductive load of load magnet 19 to the output of generator 17, Eq. (1) rewrites to:

$$\Phi_s = (L_s + L_l) I_s + M \cos \Phi I_f, \qquad (8)$$

where $L_l$ equals the load inductance. Treating this equation the same way as Eq. (1) to obtain the piak current from Eq. (7)

$$I_{s\ max} \cong \frac{I_{fo}}{2} \sqrt{\frac{L_f}{L_s + L_1}} \frac{1+k_1}{1-k_1}$$

$$\text{where } K_1 = M/\sqrt{L_f(L_s+L_1)} \qquad (9)$$

Maximizing the expression $W = \frac{1}{2} L_l I^2_{s\ max}$ dumps the largest amount of energy into the load magnet 19. A brief algebraic manipulation yields $W \sim (k-k_1)/(1-k_1)^2$ for which a maximum exists at $k_l = 2k - 1$. Since $k$ approaches unity, $k = 1 - \epsilon$, where $\epsilon << 1$, and $k_l = 1 - 2\epsilon$ from this and equal (9) we have $$L_l \cong 2\epsilon L_s = 2L_s(1-k). \qquad (10)$$

giving twice the inductance assumed in the above estimate of $Z$ due to the reduced effective magnetic coupling that occurs when adding the load inductance to the self-inductance of generator 17. This gives one half the available energy estimated above.

As understood from the above, the magnetic coupling factor $k$ should approach as close to unity as possible, since as $k$ comes closer to unity more energy dumps into the load magnet 19. Accordingly, modifications in the coil windings of generator 17, for example a generator 17 of 125 kVA nominal power, can improve the energy dumped into load magnet 19 by the system and apparatus of this invention. In this regard, the frequency of operation does not, to the first order, have an effect on the flux linkages and the short circuit currents. Thus, the combination of three poles by simple connections, within the skill of the art, in an existing six-pole generator 17 to form one equivalent pole of a two-pole generator 17, accomplishes the function of increasing the magnetic coupling factor $k$. Likewise, reducing stray flux between the stator coil 13 and field coil 15, enhances the generator factor in this regard. To this end, the introduction of heavier shorting bars to the circumference of the rotor, reduces the relevant stray fluxes. Thus 1 kJ of available energy increases to a few kilojoules of available energy for pulsing load magnet 19 in accordance with this invention.

Equation (10) provides the load inductance for optimum coupling. Because of the small value of $1 - k$, this inductance has a small value. Alternately, however, the load magnet 19 has such modified coils, within the skill of the art. Additionally, lowering the oscillation frequency satisfies the coil limitations.

In review, the above describes an AC generator for driving high oscillation currents into a load magnet. These currents decay to zero within a small faction of a second and can, therefore, pulse a load magnet for a high energy accelerator without affecting the remanent fields therein, by making use of the small leakage inductance of the AC generator. Prior to pulsing, the generator runs with the field coil conventionally powered. At the proper time and phase, the generator output switches into the load magnet, and at the same time the field coil current decays to zero. By proper matching, one obtains peak currents of the order of the generator short circuit currents. In this regard, FIG. 2 and 3 reflect tests made on a 125 kVA frequency generator, which demonstrated the feasibility of driving a few kilojoules into load magnets 19 within the first quarter cycle at a frequency between 10 and 60 $H_z$. Also, these tests showed that negligible transients occurred in the power line feeding the driving motor, since the inertia of the generator supplied a kilojoules burst to the magnets. Finally, the above discusses the relations between the generator and load magnet parameters for optimum coupling. Thus, this invention has particular application to pulsed multipole magnets for focusing charged particles in the above-mentioned BNL AGS, where in practice, the average power of the described embodiment poses little difficulty, since the above-mentioned BNL AGS has an average duty cycle of less than 10 percent. Also, FIGS. 2 and 3 illustrate the fact that opening a high current swtich, comprising SCR's before the oscillations die down completely, always achieves the described duty cycle. In this regard, the operation of the described pulsing system of this invention compares favorably with capacitor discharge or other systems in cost. Also, this invention readily achieves required oscillations in the range of between about 10 to 60 $H_z$. Thus also, as those skilled in the art will readily understand from the above, this invention applies to a wide variety of applications and magnets, over a wide range of magnetic field strengths and pulsing ranges. Typical values and catalogue numbers, for elements of one actual embodiment of the apparatus shown in FIG. 4, comprise the following:

TABLE I

| Reference No.: | Identification value and/ or number |
|---|---|
| Resistor 45 | 25Ω |
| SCR 53 | 2N 1597 |
| Zener diode 59 | 1N 3996A |
| Zener diode 61 | 1N 3996A |
| Resistor 69 | 25Ω |
| Capacitor 79 | 1.0μF |
| Transformer 81 | 1:10 |
| Resistors 85 | 1k |
| Diode 87 | 1N 3605 |
| SCR 91 | C 80E |
| SCR 93 | C 80E |
| Diode 95 | 1N 3170 |
| Diode 97 | 1N 3170 |
| Source 105 | (¹) |
| Zener diode Z | 1N 751 |
| Resistors R | 500Ω |
| $R_1$ | 500Ω |
| $R_2$ | 50Ω |
| $R_3$ | 100Ω |
| $R_4$ | 1Ω |
| $R_5$ | 2Ω |
| $R_6$ | 2. 2K |
| $R_7$ | 1K |

¹ Conventional Power Line.

This invention has the advantage of providing a simple, efficient, inexpensive, and effective pulsing system for electromagnets. To this end, this invention employs conventional apparatus in a new and novel combination, having particular application to a new and novel method for pulsing multipole magnets for focusing charged particle beams. In this regard, this invention has the advantage of switching a conventional or improved AC generator to produce a train of oscillation for many useful magnet pulsing applications.

I claim:

1. Method for pulsing an electromagnet to produce a pulsed, high strength magnetic field, comprising rotating a field coil in an AC generator having a stator coil and an energized field coil, switching said field coil off, and switching the generator output to said magnet whereby the inertia of the said rotation in said generator supplies energy to the magnet in a decaying train of oscillations.

2. The invention of claim 1 for pulsing said magnets up to several kilojoules of magnetic energy, wherein said switching takes place within a quarter cycle to produce said pulsing at an oscillation of between about 10 to 60 $H_z$.

3. The invention of claim 1 wherein said coils in said generator have a coupling coefficient close to unity.

4. The invention of claim 1 wherein the generator has a low output impedance matched with said magnet which is a quadrupole load magnet for producing a pulsed magnet field for focussing particles in a high energy charged particle beam.

5. The invention of claim 1 having a generator capable of three phase discharge.

6. Apparatus for pulsing a load magnet, comprising an AC generator having a stator coil and a rotatable field coil inductively closely coupled to each other, a trigger input means for selectively energizing and deenergizing said field coil, a voltage and phase sensor for detecting the deenergization of said field coil by said trigger input means, and trigger and swtiching unit means responsive to said detection for pulsing said load magnet with a decaying pulse of oscillations corresponding to the inertia of rotation of said field coil.

7. The invention of claim 6 having means for changing the speed of rotation of said field coil for changing the time width of said pulsing of said load magnet.

8. The invention of claim 6 having a power source means for rotating said field coil of said generator, and means for disconnecting said source means from said rotation of said field coil for isolating the said source from said field coil and generator.